(12) United States Patent
Wu et al.

(10) Patent No.: US 7,172,324 B2
(45) Date of Patent: Feb. 6, 2007

(54) INTERNALLY ILLUMINATED LIGHT PANEL WITH LED MODULES HAVING LIGHT REDIRECTING DEVICES

(75) Inventors: Chen-Ho Wu, Los Altos Hills, CA (US); Chinmau James Hwang, San Jose, CA (US); Chin-Wang Tu, Cupertino, CA (US); Ching Yuan Chung, Tao-Yuan County (TW)

(73) Assignee: Leotek Electronics Corporation, Santa Clara, CA (US)

( * ) Notice: Subject to any disclaimer, the term of this patent is extended or adjusted under 35 U.S.C. 154(b) by 82 days.

(21) Appl. No.: 11/028,928

(22) Filed: Jan. 3, 2005

(65) Prior Publication Data

US 2005/0174802 A1    Aug. 11, 2005

Related U.S. Application Data

(60) Provisional application No. 60/534,591, filed on Jan. 5, 2004.

(51) Int. Cl.
*F21W 131/00* (2006.01)

(52) U.S. Cl. .................. 362/559; 40/563; 362/612; 362/613; 362/555

(58) Field of Classification Search ............. 362/611, 362/612, 613, 555, 558, 559, 560, 800; 40/563, 40/564

See application file for complete search history.

(56) References Cited

U.S. PATENT DOCUMENTS

| 6,481,130 | B1  | 11/2002 | Wu |
|---|---|---|---|
| 6,558,021 | B2 | 5/2003 | Wu |
| 6,598,998 | B2* | 7/2003 | West et al. .............. 362/307 |
| 6,674,096 | B2* | 1/2004 | Sommers .................. 257/98 |
| 6,761,471 | B2 | 7/2004 | Wu |
| 2006/0018122 | A1* | 1/2006 | Negley ..................... 362/326 |

* cited by examiner

*Primary Examiner*—Laura K. Tso
(74) *Attorney, Agent, or Firm*—DLA Piper US LLP

(57) ABSTRACT

An illuminated sign having front, back and side surfaces. A plurality of first cavities are formed into the back surface of the sign. A plurality of light emitting modules are disposed in the plurality of first cavities. The modules each include a light emitting diode having an emission axis and for producing at least some light output generally parallel to the emission axis, an optical device disposed adjacent the light source having a reflective surface for reflecting the light output in directions that are generally perpendicular to the emission axis, and a guide element disposed adjacent the optical device for coupling the reflected light output into the interior of the sign. The guide element includes a second cavity formed therein in which the optical device is disposed. The front surface is illuminated by the coupled light output from the light emitting modules by reflection and/or diffusion inside the sign.

18 Claims, 3 Drawing Sheets

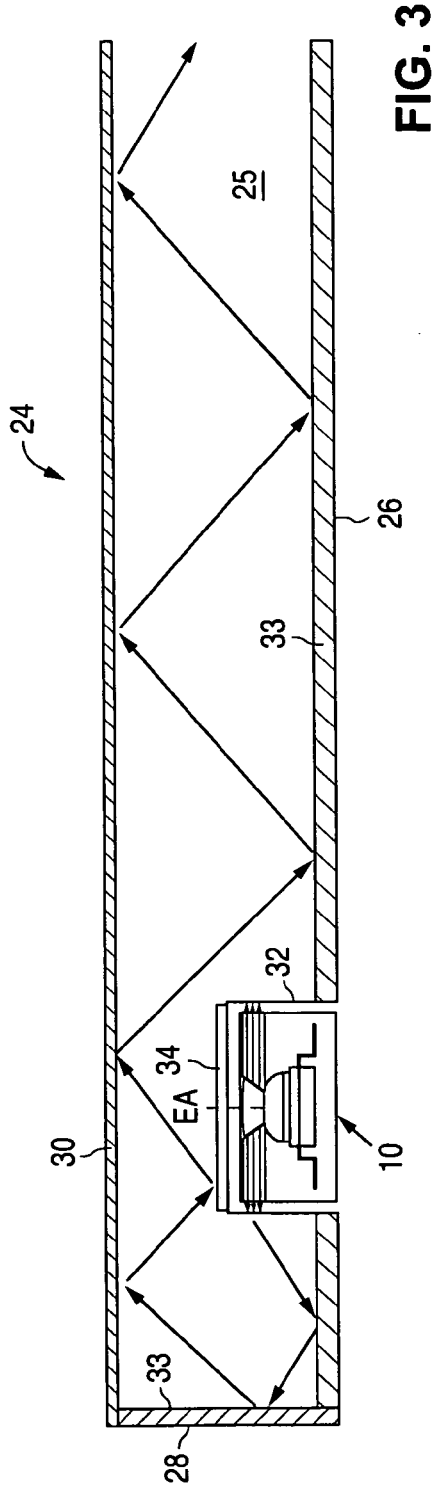
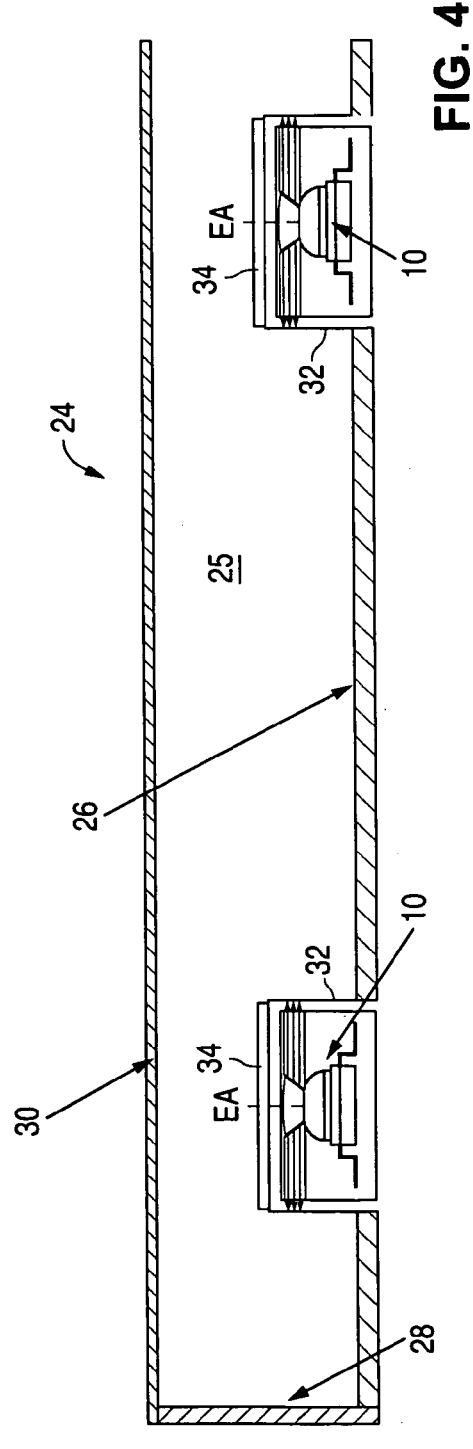

INTERNALLY ILLUMINATED LIGHT PANEL WITH LED MODULES HAVING LIGHT REDIRECTING DEVICES

This application claims the benefit of U.S. Provisional Application No. 60/534,591, filed Jan. 5, 2004.

FIELD OF THE INVENTION

The present invention relates to illuminated signs, and more particularly to Light-Emitting Diode (LED) modules for various commercial signs, light panels/objects and street name signs. The new LED design improves illumination intensity and uniformity, as compared to existing technologies such as back-lit and edge-lit signs.

BACKGROUND OF THE INVENTION

Conventional techniques to illuminate street signs, light panels or other objects with Light-Emitting Diodes (LEDs) include placing the LED light sources at the back of the panel or object (i.e. "back-lit" type) with the light shining normally to the viewing surface (see for example U.S. Pat. Nos. 6,558,021 and 6,761,471). Back-lit light sources can be placed over a large area to illuminate a light panel or object with various shapes and sizes. As each individual light source can be placed wherever the installer wants, or can be adjusted after the initial placement, during construction, back lit light sources are flexible, user-friendly and easy-to-repair. However, depending on the emission pattern (e.g. divergence) and intensity of the light sources, a certain distance between the light sources and the viewing surface is required to enable an overall uniform and bright illumination of the entire viewing surface, because many LEDs emit most of their light in a relatively small cone of viewing angles (typically centered around the emission axis of the LED). Therefore, the light panel or object body cannot be built as thin as one may desire. For thin panel applications, there simply is insufficient mixing or homogenizing at the face panel because the light coming directly from the back of the panel is either transmitted through or reflected back at the face panel.

It is also known to place the LED light sources at the side of the panel or object (i.e. "edge-lit" type) with light beaming into a light transmitting/guiding medium that re-directs the light to the viewing surface (see for example U.S. Pat. No. 6,481,130). Edge-lit light sources can be placed along the surrounding periphery of the light panel or object which includes a light-guiding medium between the light source and the viewing surface. The distance between each individual light source can be adjusted to give various light intensities and uniformity, depending on the emitting pattern and intensity of the light sources. With edge-lit sources, a thinner light panel or object body can be built. However, patches of dark regions can result when the to be illuminated areas are located over long distances from the light sources. These dark regions can occur in oversized light panels or objects because the center portions of the panel are too far from the panel/object edges, and light intensity decreases significantly as the light travels over extended distances. In addition, panels/objects with complex shapes can be difficult to illuminate evenly from irregularly shaped panel/object edges.

SUMMARY OF THE INVENTION

The present invention utilizes an optical device which is able to re-distribute a point light source and change a forward-traveling light fully sideways for uniform dispersement in all directions. Such an optical device can be placed very close to the point light source so that the light re-direction is most effective and efficient. The optical device can be constructed as an integral part of the point light source or can be built as a separate part of a light-gathering component coherently surrounding the point light source.

The present invention is a light emitting module that includes a light source having an emission axis and for producing at least some light output that is generally parallel to the emission axis, an optical device disposed adjacent the light source having a reflective surface for reflecting the light output in directions that are generally perpendicular to the emission axis, and a guide element disposed adjacent the optical device through which the reflected light output propagates.

In another aspect of the present invention, a sign includes front, back and side surfaces that define an interior of the sign, and a plurality of light emitting modules mounted to the sign. Each of the modules includes a light source having an emission axis and for producing at least some light output that is generally parallel to the emission axis, an optical device disposed adjacent the light source having a reflective surface for reflecting the light output in directions that are generally perpendicular to the emission axis, and a guide element disposed adjacent the optical device for coupling the reflected light output into the interior of the sign. The front surface is illuminated by the coupled light output from the light emitting modules.

In yet one more aspect of the present invention, a sign includes front, back and side surfaces that define an interior of the sign, wherein a plurality of first cavities are formed into the back surface of the sign, and a plurality of light emitting modules disposed in the plurality of first cavities. Each of the modules includes a light source having an emission axis and for producing at least some light output that is generally parallel to the emission axis, an optical device disposed adjacent the light source having a reflective surface for reflecting the light output in directions that are generally perpendicular to the emission axis, and a guide element disposed adjacent the optical device for coupling the reflected light output into the interior of the sign. The front surface is illuminated by the coupled light output from the light emitting modules.

Other objects and features of the present invention will become apparent by a review of the specification, claims and appended figures.

BRIEF DESCRIPTION OF THE DRAWINGS

FIG. 3 is a side cross sectional view of the LED side emitting module within a thin light panel, illustrating the scattering of light within the light-guiding medium.

FIG. 4 is a side cross section view of a plurality of LED side emitting modules of the present invention installed into a thin light panel.

DETAILED DESCRIPTION OF THE PREFERRED EMBODIMENTS

Figure 1:
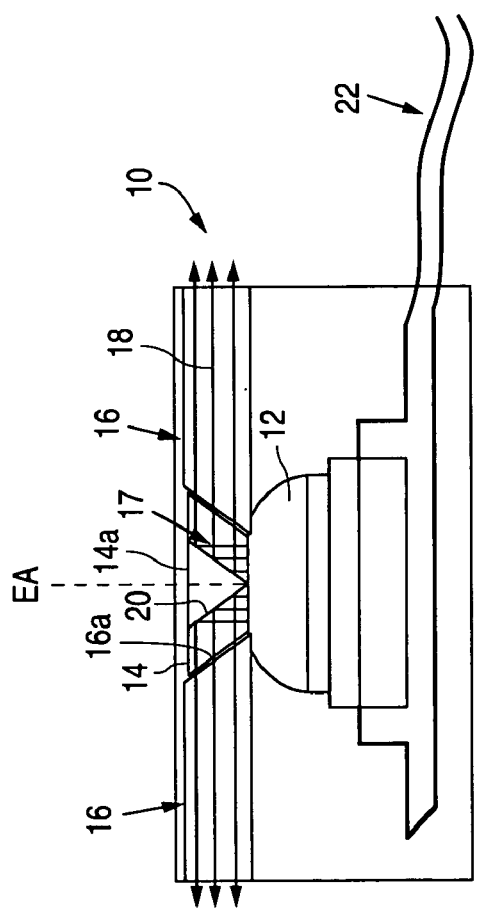
FIG. 1 is a side cross sectional view of the LED side emitting module of the present invention.

A light-emitting diode side emitting module 10 of the present invention is shown in FIG. 1. The module includes a point light source such as a light emitting diode (LED) 12 (which can include a single diode or a plurality of diodes), a light-redirecting optical device 14, and light guide element 16. The LED 12 produces an optical output generally centered around an emission axis EA and having an emission pattern that can vary widely based upon the LED model and manufacturer. Some LEDs emit most of their light in a relatively small cone of viewing angles very close to the emission axis EA. Other LEDs have a wider emission pattern with a larger cone of viewing angles. Still other LEDs emit most of the light out the sides of the LED emission housing. However, virtually all LEDs produce at least some light 17 generally parallel to the emission axis EA. The light-redirecting optical device 14 of the present invention redirects this light 17 from the LED into generally transversely propagating light emission 18 (i.e. in directions generally perpendicular to the emission axis EA), which is directed into the light guide element 16.

The light-redirecting optical device 14 is preferably conical in shape, with a conical shaped reflecting surface 20 for reflecting the LED light in the general transverse directions, preferably spreading the light evenly along a plane parallel to the plane of the sign in which the LED module is disposed. The reflecting surface 20 can be formed by a transition from higher to lower refractive index materials (i.e. air or low refractive index material formed in the center of the optical device), in which case the optical device 14 is formed of an optically transparent material where the light is reflected by total internal reflection. Alternately, the optical device can be a reflective cone disposed over the LED 12. In either case, a reflective material (e.g. reflective coating) can be used on the reflective surface 20 to help reflect the light. Power lines 22 supply electrical power to the LED 12 for producing the optical output 17.

While a conical shaped reflective surface is ideal for many types of LED's and illuminated signs for two dimensional spreading of the light, the shape and angular position of the reflective surface 20 can be varied depending on the illumination requirements of the particular sign and/or output distribution of the LED's. For example, the reflecting surface can include a pair of planar surfaces in a "V" orientation acting as mirrors for the light (ideal for LEDs with diverging light in primarily one dimension), or can be irregularly shaped to achieve the desired illumination of the sign in which it is installed, or can even be formed by one or more spherical shaped objects disposed over the LED.

The light guide element 16 can be made of a solid light transparent material with or without air gaps/chambers, or can constitute an air gap entirely, so long as the light is efficiently coupled into the sign material in which the LED module is placed. If the light guide element 16 is solid, it should be set up immediately adjacent to the optical device 14 and to the sign material itself, so that the coupling efficiency for the re-directed light into the sign material can be maximized. This is best accomplished by forming a first cavity 14a (e.g. having a conical shape) in the material used for the light redirecting optical device 14 (thus forming the reflecting surface 20), and a second cavity 16a in the light guide element 16 (dimensioned to receive the optical device 14 therein). Index matching materials can be used to facilitate efficient optical coupling between the optical device 14 and the light guide element 16, and between the light guide element 16 and the sign material. Preferably, the light guide element is also used to partially or completely encapsulate LED 12, for better integrity and easier installation of module 10.

Figure 2:
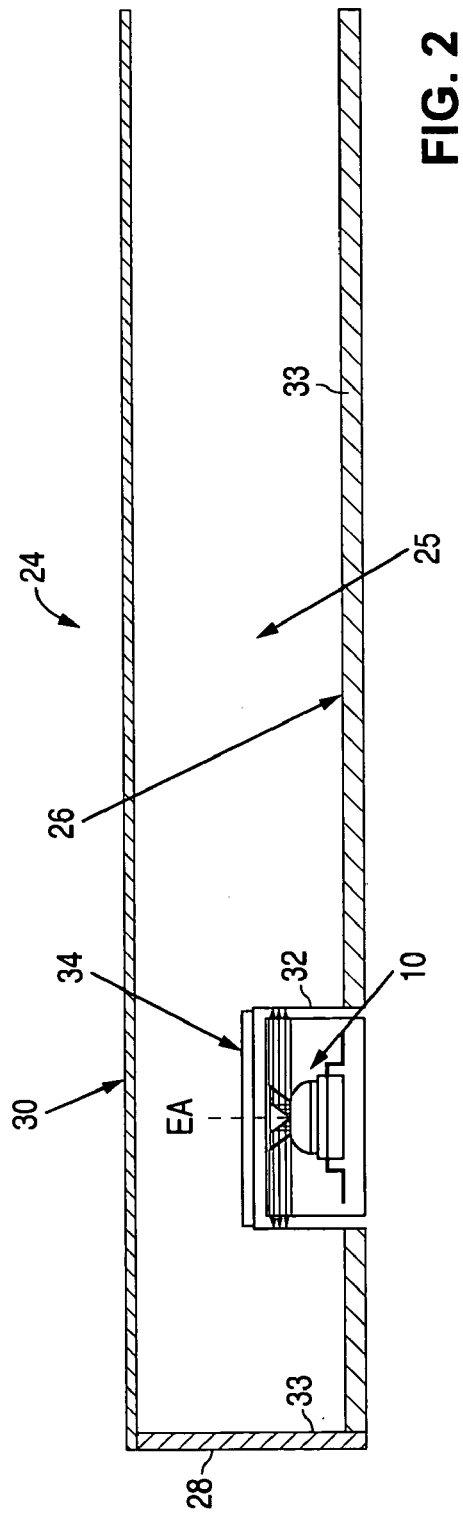
FIG. 2 is a side cross section view of the LED side emitting module of the present invention installed into a thin light panel.

FIG. 2 illustrates the LED module 10 of the present invention installed in an illuminated sign 24. The sign 24 includes a back surface 26, side surfaces 28, and a front (viewing) surface 30. Preferably, the sign is made of solid material that serves as a light guiding medium 25, but can be hollow or include hollow portions as well (in which case air would act as the light guiding medium 25 within sign 24). A cavity 32 is formed into the back surface 26 of sign 24. The cavity 32 is sized to receive the LED module 10. To enhance illumination of the front surface 30, the back and side surfaces 26/28 can include reflective material 33 to better reflect incident light. A patterned screen or other material can be used to create symbols or indicia on the front surface 30. Reflective material 34 (preferably opaque) can also be formed or disposed directly over the LED module 10 to prevent over-illumination (e.g. a hot spot) on the portion of the front surface 30 directly above the module 10, as well as light loss back into the cavity 32. FIG. 3 illustrates how the light, transversely emitted from the LED module 10, diffuses, scatters and/or internally reflects inside the sign 24 to illuminate a broad area of the front surface 30. The material inside the sign diffuses light toward the viewing surface, and/or the back and side surfaces reflect light toward the viewing surface. FIG. 4 illustrates how a plurality of spaced apart LED modules 10 can be used to illuminate the sign 24.

Any size and shape sign can be illuminated using the LED modules 10 of the present invention by selecting the desired density and locations of the LED modules within the sign. The versatility of injecting light transversely into the sign at any selected locations of the sign 24 is accomplished without creating hot spots at those locations, while achieving the desired illumination intensity and uniformity.

Figure 5:
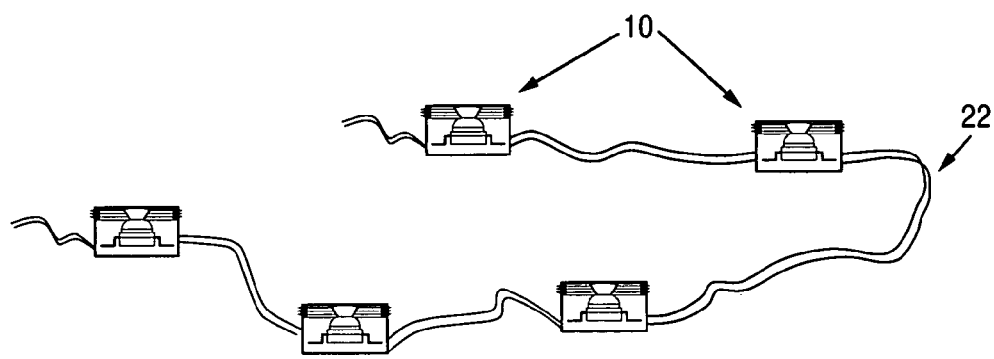
FIG. 5 is a perspective view of a string of the LED side emitting modules of the present invention.
Figure 6:
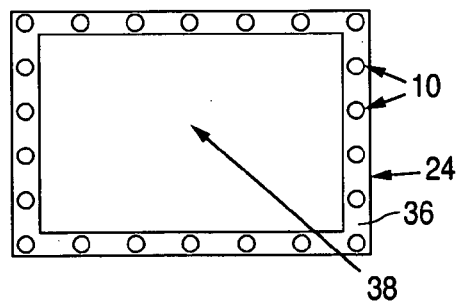
FIG. 6 is a top view of a thin light panel with a plurality of the LED side emitting modules installed around the edges of the panel.
Figure 7:
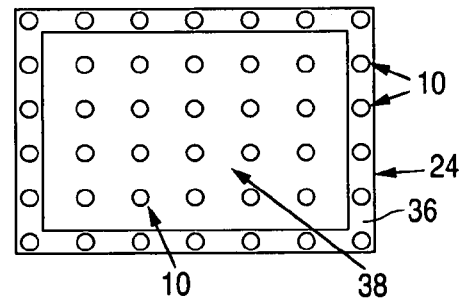
FIG. 7 is a top view of a thin light panel with a plurality of the LED side emitting modules installed around the edges of the panel and in the center of the panel.
Figure 8A:
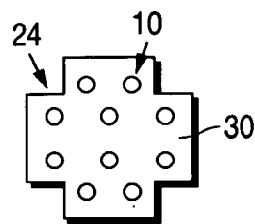
FIGS. 8A and 8B are top views of thin light panels of complex shape with a plurality of the LED side emitting modules installed to evenly illuminate the panels.
Figure 8B:
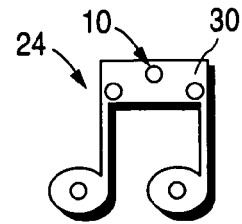

In order to conveniently install multiple LED modules 10 in various applications, strings of modules 10 can be made as shown in FIG. 5, where the modules 10 are connected together using wires and drawing power from a single power source (not shown). Examples of using the LED modules of the present invention for various applications are shown in FIGS. 6 to 8B. In FIGS. 6–7, the front surface has an opaque portion 36 around the edge and a light transmitting portion 38. In this case, the light redirecting optical devices could be designed to direct most of the light toward the center of the sign. In FIG. 6, the LED modules 10 are all disposed under the opaque portion 36, where in FIG. 7 additional LED modules 10 are disposed under the light transmitting portion 38 as well. In FIGS. 8A and 8B, the LED modules 10 are disposed under selected portions of the irregularly shaped light transmitting front surface 30. As can be seen from these examples, various sizes and shapes can be used because of the flexibility in the installation of the modules 10. The light intensity and the uniformity can be adjusted by placing the modules at various locations and at various densities.

The present invention combines the advantages of back-lit and edge-lit techniques to make large-area, light-tunable, versatile-shaping, user-friendly, ultra-thin LED-illuminated light panels or objects. The present invention is flexible and adjustable in nature, because the individual light sources can be placed at will within a thin sign without creating hot spots. The use of a light guiding medium for delivering transversely directed light, as in an edge-lit product, allows the light from each light source from various locations to mix consistently and coherently before being seen at the viewing surface. This characteristic allows the light panel, though ultra thin in nature, to display a uniform and continuous light intensity and color across the whole viewing surface. Also, one will be able to tune the light intensity and color in shade, and to avoid any formation of dark patches on the viewing surface. All in all, one achieves a superior LED-illuminated light panel or object in a slim, lightweight, and easy to build, modify, install and maintain product.

It is to be understood that the present invention is not limited to the embodiment(s) described above and illustrated herein, but encompasses any and all variations falling within the scope of the appended claims. For example, the LED modules could be used to intentionally illuminate the side and/or back surfaces 28/26 as well. In certain applications, light modules could even be installed in cavities formed in the side and/or front surfaces 28/30 as well as or instead of cavities formed in the back surface. The point sources of light are preferably single LEDs or clusters of LEDs, but could be any light source producing an optical output that can effectively be transversely reflected along the interior of the sign.

What is claimed is:

1. A sign, comprising:
   front, back and side surfaces that define an interior of the sign;
   a plurality of light emitting modules mounted to the sign, each of the modules including:
      a light source having an emission axis and for producing at least some light output that is generally parallel to the emission axis,
      an optical device disposed adjacent the light source having a reflective surface for reflecting the light output in directions that are generally perpendicular to the emission axis, and
      a guide element disposed adjacent the optical device for coupling the reflected light output into the interior of the sign;
   wherein the front surface is illuminated by the coupled light output from the light emitting modules.

2. The sign of claim 1, wherein a plurality of cavities are formed into the back surface, and wherein the plurality of light emitting modules are disposed in the plurality of cavities.

3. The sign of claim 2, further comprising:
   reflective material disposed along surface portions of the cavities.

4. The sign of claim 1, further comprising:
   reflective material disposed along the back and side surfaces.

5. The sign of claim 1, wherein the front surface includes edge portions that are opaque, and wherein the plurality of light emitting modules are disposed under the opaque portions.

6. The sign of claim 1, wherein the front surface is irregularly shaped.

7. The sign of claim 1, wherein for each of the light modules, the reflective surface is conical in shape.

8. The sign of claim 1, wherein for each of the light modules, the reflective surface is V-shaped.

9. The sign of claim 1, wherein for each of the light modules, the optical device includes optically transparent material with a cavity formed therein, and wherein a side surface of the cavity constitutes the reflective surface.

10. The sign of claim 9, wherein for each of the light modules, the cavity contains a first material having a refractive index that is lower than that of a refractive index of the optically transparent material, and wherein the light output is reflected at the reflective surface by total internal reflection.

11. The sign of claim 1, wherein for each of the light modules, the guide element includes a solid optically transparent material with a cavity formed therein, and wherein the optical device is disposed in the cavity.

12. The sign of claim 1, wherein for each of the light modules, the light output is generally centered around the emission axis, and wherein the reflective surface evenly distributes the reflected light along a plane of the sign interior.

13. A sign, comprising:
   front, back and side surfaces that define an interior of the sign, wherein a plurality of first cavities are formed into the back surface of the sign;
   a plurality of light emitting modules disposed in the plurality of first cavities, each of the modules including:
      a light source having an emission axis and for producing at least some light output that is generally parallel to the emission axis,
      an optical device disposed adjacent the light source having a reflective surface for reflecting the light output in directions that are generally perpendicular to the emission axis, and
      a guide element disposed adjacent the optical device for coupling the reflected light output into the interior of the sign;
   wherein the front surface is illuminated by the coupled light output from the light emitting modules.

14. The sign of claim 13, wherein the guide element includes a second cavity formed therein in which the optical device is disposed.

15. The sign of claim 13, further comprising:
   reflective material disposed along surface portions of the first cavities; and
   reflective material disposed along the back and side surfaces of the sign.

16. The sign of claim 13, wherein for each of the light modules, the reflective surface is conical in shape.

17. The sign of claim 13, wherein for each of the light modules, the reflective surface is V-shaped.

18. The sign of claim 13, wherein for each of the light modules:
   the optical device includes optically transparent material with a second cavity formed therein,
   a side surface of the cavity constitutes the reflective surface,
   the second cavity contains a first material having a refractive index that is lower than that of a refractive index of the optically transparent material, and
   the light output is reflected at the reflective surface by total internal reflection.

* * * * *